United States Patent [19]
Ullmann et al.

[11] 3,710,067
[45] Jan. 9, 1973

[54] METHOD AND APPARATUS FOR WIDENING THE FIELD OF APPLICATION OF ELECTRO-EROSION MACHINING AMD IMPROVING THE CONDITIONS ARISING IN THE WORK GAP

[75] Inventors: Werner Ullmann, Locarno; Renato Derighetti, Muralto; Costantino Tadini, Locarno; Roberto Farinelli, Losone; Silvano Mettei, Solduno, all of Switzerland

[73] Assignee: A. F. fur Industrielle Elektronik Agie, Losone be Locarno, Losone, Switzerland

[22] Filed: Dec. 28, 1970

[21] Appl. No.: 101,718

[30] Foreign Application Priority Data

March 26, 1970 Switzerland.........................4653/70

[52] U.S. Cl...............219/69 C, 219/69 G, 219/69 M
[51] Int. Cl.............................B23p 1/08, B23p 1/14
[58] Field of Search......219/69 D, 69 E, 69 G, 69 M, 219/69 R, 69 V, 123

[56] References Cited

UNITED STATES PATENTS

| 510,777 | 12/1893 | Coffin | 219/123 X |
| 1,711,151 | 4/1929 | Lincoln | 219/123 X |
| 2,079,310 | 5/1937 | Bennett | 219/69 V X |
| 3,061,708 | 10/1962 | Pfau | 219/69 D |

FOREIGN PATENTS OR APPLICATIONS

| 1,388,930 | 1/1965 | France | 219/69 M |

Primary Examiner—R. F. Staubly
Attorney—Werner W. Kleeman

[57] ABSTRACT

There is disclosed a method and apparatus for widening the field of application of electro-erosion machining techniques and for improving the conditions which arise in the work gap, this work gap being constituted by at least one tool electrode and at least one workpiece electrode and contains a liquid and/or gaseous medium. At least one generator is provided for delivering an operating voltage to the work gap. According to an important aspect of the present invention, a magnetic field is superimposed at the work gap upon the operating voltage, the magnetic lines of force of which magnetic field are situated essentially perpendicular to the erosion front.

26 Claims, 21 Drawing Figures

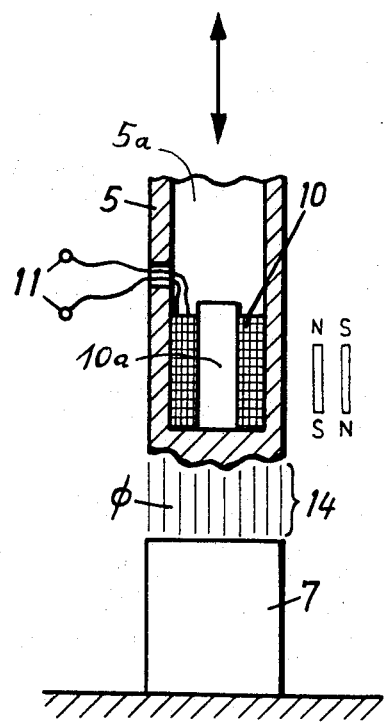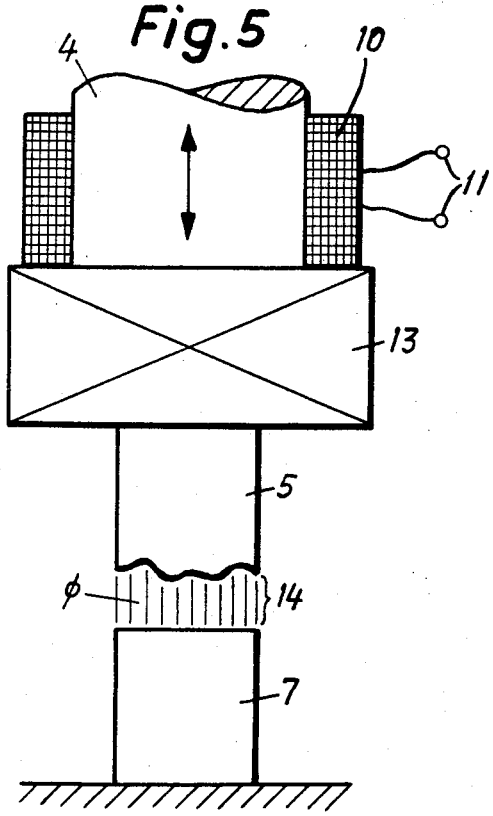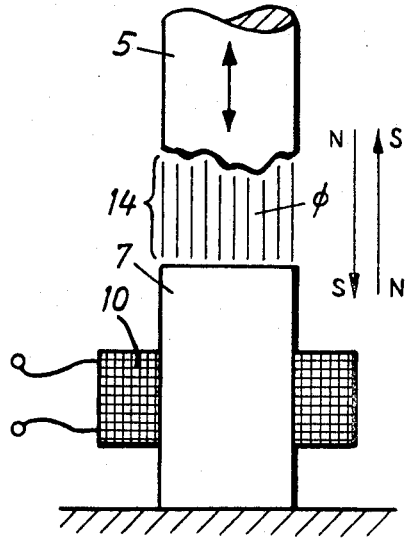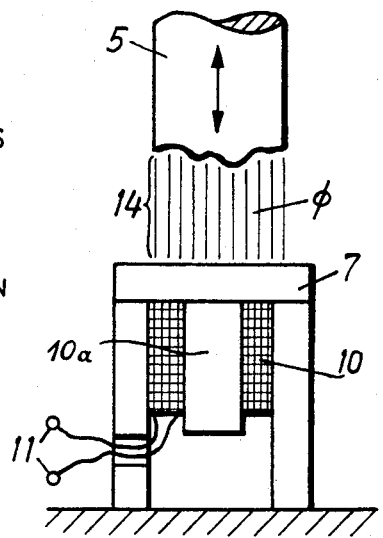

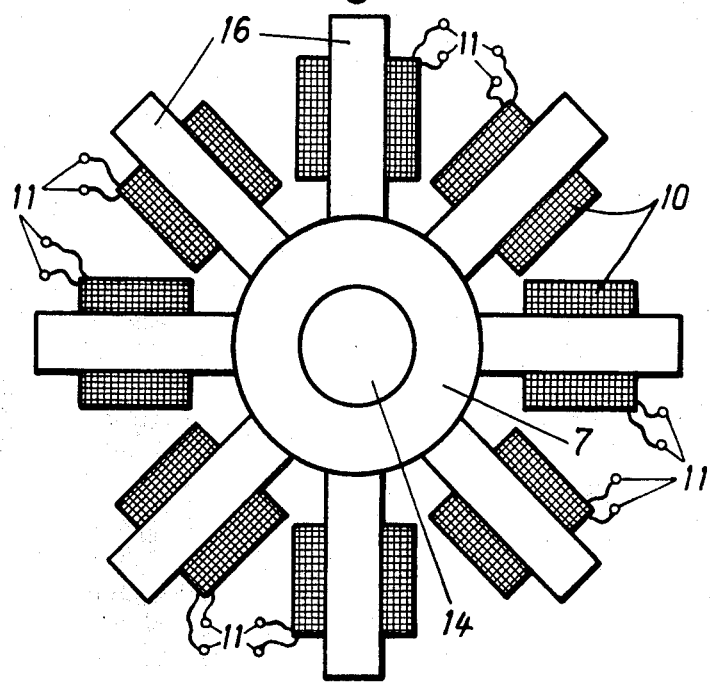
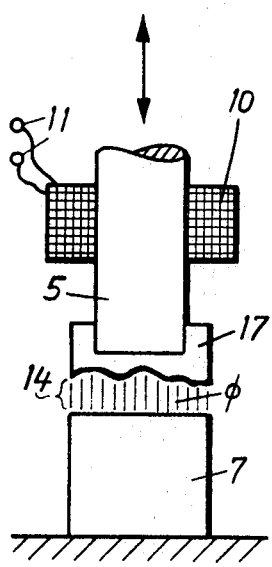
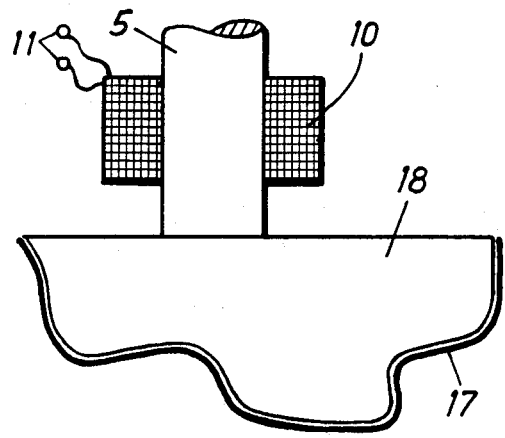

METHOD AND APPARATUS FOR WIDENING THE FIELD OF APPLICATION OF ELECTRO-EROSION MACHINING AMD IMPROVING THE CONDITIONS ARISING IN THE WORK GAP

BACKGROUND OF THE INVENTION

The present invention relates to a new and improved method of, and apparatus for, widening the field of application of electro-erosion machining techniques and for improving the conditions arising in the work gap, this work gap being formed by at least one tool electrode and at least one workpiece electrode and containing a liquid and/or gaseous medium, at least one generator being provided for delivering an operating voltage to the work gap.

As is well-known to those versed in the EDM art, generators are used for the machining of workpieces. The tool electrode and the workpiece, consisting of electrically conductive materials, are approached towards one another to that extent until they form a work gap. This work gap is typically in the order of magnitude of several millimeters up to several thousandths of a millimeter. As is well-known, the size of the work gap is dependent upon the different problems encountered and the machining operations to be performed. For instance, for coarse machining, generally referred to as roughening, a larger size of the work gap is required than the fine machining operations, which are generally referred to as finishing or polishing. Such is necessitated by the electrical parameters, such as voltage, current and pulse duration, which, as is similarly known to those initiated in the art, can be regulated at the generator. Thus, for a prescribed surface quality, there is determined a given width of the work gap. Therefore, for coarse machining operations, the tool electrode must possess different spatial dimensions than during finishing. The greater the quality of the machined surface of the workpiece, the smaller must be the width of the work gap. During finishing, difficulties arise during removal of the waste materials from the gap and disturbances in the normal operation exist, owing to the small size of the gap. These disturbances cause a forward- and rearward movement of the tool electrode relative to the workpiece electrode. Consequently, there results an extensive non-desired wear of the tool electrode and there, additionally, exists a small material removal efficiency at the workpiece electrode. When using certain combinations of materials of the tool electrode and the workpiece electrode, such as for instance steel-steel, there exists a time-delay of the beginning of the machining operation until stabilization of the operation of the equipment has occurred. With such combinations of materials, the residual magnetic remanance is disadvantageously noticeable since it contributes to the operational instability.

SUMMARY OF THE INVENTION

Accordingly, it will be evident that a real need still exists in the art for electro-erosion machining techniques and equipment for performing such machining operations which are not associated with the aforementioned drawbacks present in existing equipment. Hence, a primary object of the present invention is to provide an improved method of, and apparatus for, effectively overcoming the aforementioned drawbacks of the prior art existing with conventional equipment and machining techniques of the type described, and which effectively and reliably fulfill the prevailing need.

Another and more specific object of the present invention is concerned with improving upon the aforementioned characteristic interrelationships of the known machining techniques, and specifically, allows for varying the width of the work gap without influencing the surface quality of the machined piece, further resulting in improving the flushing of the work gap due to the increased size thereof, and additionally, improves the stability at the beginning of the machining operation and during the actual machining operation.

Still a further significant object of the present invention resides in the features that the ignition voltage, which as is known ignites the discharge in the work gap, can be reduced, since the work gap is magnetically enlarged and therefore the desired operation stability can be attained.

Due to the fulfillment of the last-mentioned object, it is possible to design simpler and less expensive generators, and therefore a further objective of this invention is the design of improved electro-erosion machining techniques and apparatus enabling the provision of more economical and simpler constructed generators.

A further significant object of the present invention resides in the features of magnetically controlling the width of the work gap at electro-erosion equipment so that it is possible to use the same tool electrode for coarse machining and for fine machining or finishing operations.

Yet a further noteworthy object of the present invention is concerned with overcoming or minimizing the effects of the residual remanance in the electrodes so that it is possible to improve upon the machining operation.

Finally, in consideration of the foregoing general objects, it is to be noted that an important objective of the present invention is to provide an improved method and apparatus for widening the field of application of electro-erosion machining operations and for improving the conditions which arise in the work gap.

Now, in order to implement these and still further objects of the invention, which will become more readily apparent as the description proceeds, the inventive method is generally manifested by the features that a magnetic field in the work gap is superimposed upon the operating voltage, and the lines of force of this magnetic field are situated essentially perpendicular to the erosion front.

Generally speaking, the apparatus of the present invention manifests itself through the arrangement of at least one electromagnetic coil and/or at least one permanent magnet arranged in a magnetic circuit closed by the work gap.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 4 shows an arrangement of an electromagnetic coil or a permanent magnet at the tool electrode;

FIG. 5 is an enlarged view showing the arrangement of the electromagnetic coil or the permanent magnet at the neighborhood of the tool electrode;

FIG. 6 illustrates the arrangement of the electromagnetic coil or a permanent magnet at the workpiece electrode;

FIG. 7 illustrates the arrangement of the electromagnetic coil or the permanent magnet within the workpiece electrode;

FIG. 15 is a top plan view of a plurality of electromagnetic coils or a number of or plurality of electromagnetic coils or a number of permanent magnets provided at the direct neighborhood of the work gap at the workpiece electrode;

FIG. 16 illustrates the arrangement of a magnetic coil or a permanent magnet about the tool electrode and which consists of a paramagnetic or diamagnetic material;

FIGS. 17, 18, 19 and 20 illustrate preferred embodiments of tool electrodes.

DETAILED DESCRIPTION OF THE PREFERRED EMBODIMENTS

Figure 1:
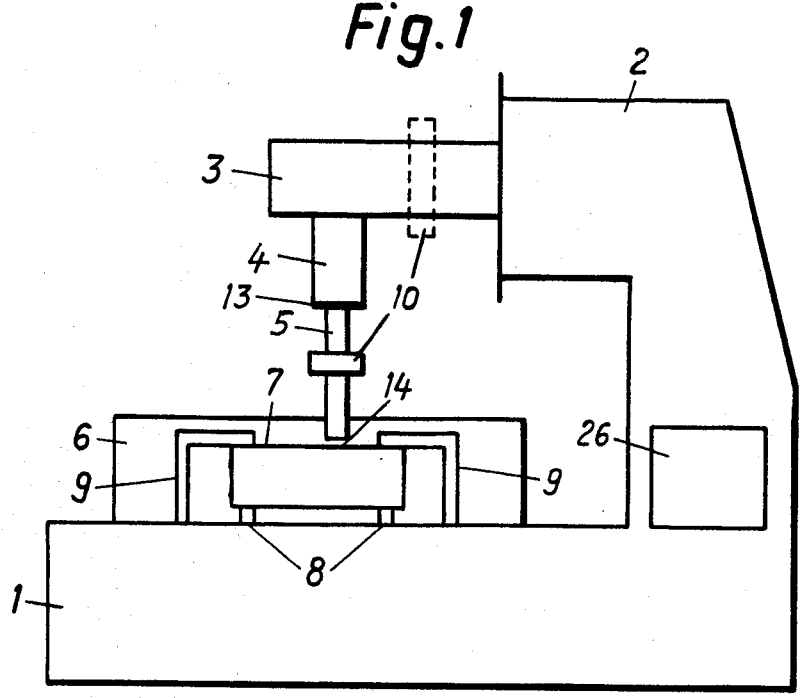
FIG. 1 schematically illustrates the general arrangement of an electro-erosion machine of the present invention.

Describing now the drawings, the exemplary embodiment of electro-erosion machine depicted in FIG. 1 will be seen to comprise a table 1 and the upright or stand 2, on which there is displaceably arranged the conventional feed or advancing mechanism 3. An electrode holder or support 4 is provided at the feed mechanism 3, a tool electrode 5 being secured to the lower end of this electrode holder 4. This tool electrode 5 is electrically insulated at 13 from the electrode holder 4. The electrical connection of the tool electrode 5 to the generator accommodated in the upright 2 and the table 1, is disposed in any conventional way within the electrode holder 4 and the feed mechanism 3. The manner in which this electrical connection is arranged within these components has not been particularly shown in the drawings since it is generally known, and moreover, does not constitute part of the actual subject matter of the present invention.

Continuing, it will be observed that a vessel 6 is mounted upon the surface of the table 1. Within this vessel or container 6, there is arranged the workpiece electrode 7 which is connected by means of any suitable clamping or fixing mechanism 9 to the supports 8. Further, as has been generally indicated in full lines in FIG. 1, at location 12, there is provided an electromagnetic coil or a permanent magnetic for the tool electrode 5. If element 12 is an electromagnetic coil, then it is equipped with two conductors or lines, which have not been particularly shown in FIG. 1, for the purpose of delivering current thereto from a direct-current voltage source or alternating-current voltage source provided within the upright or stand 2 or within the table 1. Furthermore, in FIG. 1 there is likewise shown in phantom lines, at location 10, an electromagnetic coil or a permanent magnet which is arranged about the feed mechanism 3. This is intended to indicate that an electromagnetic coil or a permanent magnet, which, as is required for carrying-out the inventive method, can either be provided at the tool electrode 5 or at the feed or advancing mechanism 3. The permanent magnets or electromagnetic coils, which may be provided either at locations 12 or 10 of the arrangement of FIG. 1, generate a magnetic flux $\phi$ in the magnetic circuit, which, according to the arrangement of FIG. 1, is formed by the table 1, the upright 2, the feed mechanism 3, the electrode holder 4, the tool electrode 5, the workpiece electrode 7, and the supports 8 and the fixing mechanism 9. The arrangement of the electromagnetic coil or the permanent magnet can therefore be undertaken at any desired location of the magnetic circuit. Furthermore, it will be readily apparent that it is equally possible to provide a number of electromagnetic coils or a number of permanent magnets within this magnetic circuit. Additionally, as will be more fully developed later during the discussion of this invention, the electromagnetic coils or the permanent magnets need not, as shown in the arrangement of FIG. 1, be disposed about the components of the equipment forming the magnetic circuit. They could be equally arranged within the components mentioned above. Moreover, the electromagnetic coil need not be formed of a larger number of turns or windings, rather can also be constituted by a single winding. This single winding can be, for instance, cast in the housing of the electro-erosion equipment depicted in FIG. 1, and therefore forms a component of the machinery. Naturally, if this arrangement is utilized, the cast winding must be insulated from the housing of the machine.

Now, it will be observed that a control device 26 is located at the upright or stand 2, this control device serving for controlling the generator and the magnetic field when using an electromagnetic coil. While the details of the control device 26 do not constitute part of the present invention, and control devices suitable for use with the invention are well-known in the art, it is to be recognized that, as is known, such control device 26 is used for adjusting the electrical parameters, such as voltage, current, and the pulse duration and repetition frequency of the work pulses of the generator, and specifically in such a manner that the electro-erosion machining operation properly takes place between the tool electrode 5 and the workpiece electrode 7. It is not necessary for one tool electrode to be placed opposite a workpiece electrode. Quite to the contrary, it would be possible to utilize for the machining operation a number of tool electrodes and a number of workpiece electrodes. These electrodes form a work gap 14. Within the vessel or container 6, there is a gaseous or liquid medium, which is introduced by any known delivery or supply device into the vessel 6 in such a way that the medium fills the work gap 14 between the tool electrode 5 and the workpiece electrode 7.

This medium can be either a liquid or gaseous dielectric medium or an electrolytic liquid. As is further known in equipment of this type, such medium serves to flush the work gap during the machining operation, so that the waste products, in other words the material removed from the surface of the workpiece electrode 7, can be conveyed away. In the case of the prior art electro-erosion machining equipment, the flushing conditions of the medium are impaired when the gap becomes smaller. Moreover, it is well-known that the actual electro-erosion machining operation itself is undertaken by displacing the tool electrode 5, by means of the feed mechanism 3, mechanically or pneumatically or hydraulically with the use of oil, or in any other suitable way, in a direction towards the tool electrode 7. When the correct size of the work gap 14 has been reached, then sparks or work pulses delivered by the generator appear across the work gap. The tool electrode 5 is automatically moved by the feed mechanism 3 as a function of the removal of material from the surface of the workpiece electrode 7. Due to the machining operation which is performed by this type of equipment, the shape of the electrode 5 is reproduced at the workpiece electrode 7.

It is also to be remarked that the surface of the tool electrode 5 and the surface of the workpiece electrode 7, which are situated opposite one another and only separated by a very small work gap 14, as a practical matter always exhibit a certain surface roughness, that is to say, raised portions, depressions, projections, and so forth, and therefore at these preferred locations there are formed the sparks or work pulses which generate, as is known, depressions designated as creators in the surface of the workpiece electrode 7. During coarse machining which is carried-out with a relatively large work gap, there necessarily exists a great surface roughness. In order to reduce this surface roughness, the finishing operation follows the coarse machining operation. Since finishing is undertaken with a very small work gap, poor flushing conditions prevail so that the waste products cannot always be removed to the desired degree from the work gap 14. By virtue of the inventive method, there is contemplated applying a magnetic field $\phi$, which during finishing, increases the size of the work gap although the electrical parameters, adjusted by means of the control device 26 of the generator, are not changed. Owing to the increase in the size of the work gap, there are improved flushing conditions. The magnetic field $\phi$ is situated at the work gap 14 essentially perpendicular to the erosion front. The expression "erosion front" as used in the context of this disclosure is intended to designate those surfaces of the tool electrode 5 and the workpiece electrode 7 which participate in the erosion operation, that is to say electro-erosion machining operation. These surfaces are designated as the "effective surfaces" or "effective surface." In the description to follow the expression "front or frontal work gap" is intended to designate those surfaces of the tool electrode 5 and the workpiece electrode 7 located in the feed direction. The expression "lateral work gap" is intended to denote those surfaces of both electrodes which are situated transverse to the feed direction.

If the direct-current voltage source or the alternating-current voltage source for the supply of current to the electro-magnetic coil 10 is varied by means of the control device 26, then, owing to the altered magnetic field $\phi$ the width of the work gap 14 is changed in analogous manner. Thus, when the magnetic field $\phi$ increases, the width of the work gap 14 enlarges. As already mentioned, this occurs without changing the electrical parameters adjusted at the generator. Depending upon how the magnetic field $\phi$ is controlled at the work gap, there occur improvements at the frontal or lateral work gap regions. The magnetic field $\phi$ can be adjusted to a predetermined intensity prior to beginning a machining operation. However, this magnetic field can also be changed during the actual machining operation. In the last-mentioned situation, there result recesses at the workpiece electrode 7 which possess a different form or configuration than the tool electrode 5.

The favorable influence of the electro-erosion machining operation due to the presence of a magnetic field $\phi$ cannot be exactly theoretically explained since even today it is not possible to completely explain what occurs during the electo-erosion machining operation at the work gap. It may be possible, for instance, to postulate or assume that the unexpected effect of the magnetic field $\phi$ at the work gap exists because the waste products, which have been eroded at the surface of the workpiece electrode, are aligned by the magnetic field $\phi$ and, therefore, provide a favorable strike-over path for the sparks or work pulses. The waste products consist of metallic particles which are partially surrounded by an insulating layer. This insulating layer emanates from the media present at the work gap. Another explanation for the unexpected effect of the magnetic field $\phi$ can be, for instance, possibly given in that each spark or work pulse which strikes over at the work gap represents a flow of current. As is known, this current flow forms a circular-shaped magnetic field which is disposed perpendicular to the current flow. When the plane of the circular-shaped magnetic field is perpendicular to the magnetic field $\phi$ generated by the electromagnetic coil or the permanent magnet 12, there does not occur any influencing of the sparks or work pulses. In other words, this means that the sparks or work pulses with a current flow which is parallel to the magnetic field $\phi$ arrive without influence from the tool electrode 5 through the work gap 14 at the workpiece electrode 7. Those sparks or work pulses which do not appear along the shortest path of the work gap experience a correction of their strike-over path by the magnetic field $\phi$. The last-mentioned sparks or work pulses possess a longer strike-over path determined by the projections of the surface roughness than the width of the work gap. The magnetic field $\phi$ generated by the electromagnetic coil 10 or by the permanent magnet 12 now exerts a force upon such sparks so that they assume the shortest strike-over path. It is however also conceivable that the magnetic field $\phi$ suppresses the work sparks or pulses which tend to assume a longer strike-over path than the width of the work gap, so that only those sparks or work pulses which assume the shortest strike-over path at the work gap 14 will arrive without hindrance at the workpiece electrode 7.

There will now be discussed the different arrangements of the electromagnetic coil 10 or the permanent magnet 12 for generating a magnetic field $\phi$ at the work gap 14.

Figure 2:
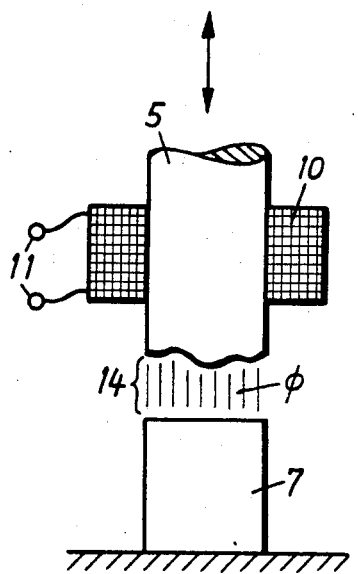
FIG. 2 is a schematic view showing details of the arrangement of an electromagnetic coil and the tool electrode.

Turning now to FIG. 2, there is illustrated schematically an arrangement of an electromagnetic coil 10 about the tool electrode 5 consisting of a ferromagnetic material. The supply of current to the electromagnetic coil 10 is undertaken by means of the conductors 11 which are electrically coupled with the previously discussed direct-voltage source or alternating-voltage source of the electro-erosion equipment depicted in FIG. 1. At the work gap 14 there appears the magnetic field $\phi$ generated by the electromagnetic coil 10. The workpiece electrode 7 likewise consists of ferromagnetic material. The double-headed arrow located above the tool electrode 5 schematically represents the forward and rearward movement possibilities for the electrode. With the arrangement depicted in FIG. 2, there is present the previously defined frontal work gap 14. Upon increasing the magnetic field $\phi$, the work gap enlarges. When coupling the electromagnetic coil 10 to the direct-current voltage source, there naturally occurs a static magnetic field $\phi$. A magnetic alternating field $\phi$ is present when coupling the electromagnetic coil 10 with the alternating-current voltage source. The significance of the magnetic alternating field will be more fully discussed hereinafter.

Figure 3:
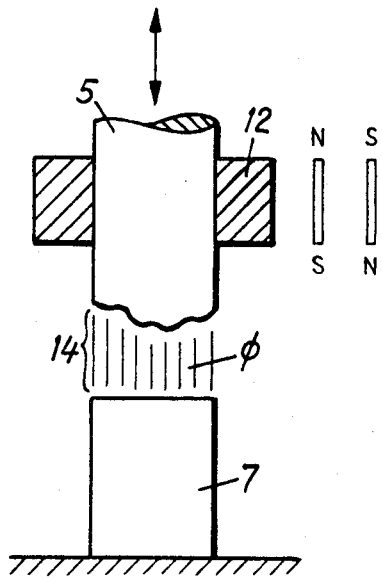
FIG. 3 is a view similar to FIG. 2 showing the arrangement of a permanent magnetic and the tool electrode.

FIG. 3 shows the arrangement of a permanent magnet 12 about the tool electrode 5. The permanent magnet 12 can be arranged in such a fashion that the north pole faces upwards in the drawing and the south pole is directed towards the work gap 14. Of course, it is also possible that the south pole S is upwardly directed and the north pole N faces the work gap 14 or the workpiece electrode 7. These possibilities have been schematically indicated in the showing of FIG. 3 by the corresponding arrangement of the letters N,S for the two possible situations. The width of the work gap 14 is adjusted in accordance with the strength of the permanent magnet 12 and the static magnetic field $\phi$. A comparison of the arrangements of FIGS. 2 and 3 will render it evident that the electromagnetic coil 10 and the permanent magnet 12 can be readily mutually exchanged. This exchangeability is also possible for the arrangements depicted in the following figures and, therefore, has only been symbolically represented so as to simplify the showing of the drawings.

FIG. 4 illustrates a tool electrode 5 within which there is arranged the electromagnetic coil 10 or the permanent magnet 12. The tool electrode 5 and the workpiece electrode 7 are disposed opposite one another and define therebetween the frontal work gap 14. The electromagnetic coil 10, which is electrically coupled by means of the lines or conductors 11 to the direct-current voltage source or the alternating-current voltage source, generates the magnetic field $\phi$. In this instance, one can be dealing with both a static magnetic field or a magnetic alternating field. The electromagnetic coil 10 can be, of course, replaced by the permanent magnet 12. It is advantageous if the north pole N of the permanent magnet is directed upwardly and the south pole S in the direction of the work gap 14. However, by way of completeness, it is here also to be mentioned that the electromagnetic coil 10 can be provided with an iron core at its central region, as indicated at 10a, which, in known fashion, more markedly bunches up the magnetic field. The electromagnetic coil 10 or the permanent magnet 12 fill that portion of the hollow compartment 5a of the tool electrode 5 which is situated closest to the work gap 14. This arrangement is advantageous if the tool electrode 5 or the workpiece electrode 7 consists of a paramagnetic or diamagnetic material. When using ferromagnetic materials for the electrodes the close arrangement of the electromagnetic coil or the permanent magnet to the work gap is not absolutely necessary. Once again, it will be understood that the width of the work gap 14 varies in accordance with the intensity of the magnetic field $\phi$.

FIG. 5 shows an arrangement of magnetic coil 10 or permanent magnet 12 at the tool electrode 5. Between the actual tool electrode 5 and the electromagnetic coil 10 or the permanent magnet 12 there is located the clamping mechanism 13 which is necessary, as will be necessary to those versed in the art, for clamping the electrode. Moreover, the permanent magnet 12 can be arranged in such a fashion that its north pole is directed towards the holder mechanism 4 and its south pole towards the clamping mechanism 13, or vice versa. The magnetic field $\phi$ which exists at the work gap 14 can be varied in intensity, so that as already explained above, the work gap is enlarged during ascending strength or intensity of the magnetic field. FIG. 5 is an example of how it is possible to control the frontal work gap. Furthermore, FIG. 5 also shows that when using ferromagnetic materials for the workpiece electrode and the tool electrode, the electromagnetic coil or the permanent magnet can be arranged at a large distance from the work gap.

FIG. 6 illustrates a still further embodiment for controlling the frontal work gap 14 by varying the intensity of the static or alternating magnetic field $\phi$. In this embodiment, the electromagnetic coil 10 or the permanent magnet 12 are arranged about the workpiece electrode 7. In this case, both electrodes 5,7 consists of ferromagnetic materials. The poles of the permanent magnet 12 can be arranged in such a fashion with respect to the work gap 14 as such has been symbolically represented in FIG. 6 by the letters N and S.

FIG. 7 illustrates a further embodiment for controlling the frontal work gap 14. The electromagnetic coil 10 or the permanent magnet 12 is arranged in the workpiece electrode 7. This is generally the situation when the workpiece electrode 7 is formed of a paramagnetic or diamagnetic material. The magnetic field $\phi$ is therefore only located at the frontal work gap 14 between the workpiece electrode 7 and the tool electrode 5. The electromagnetic coil 10 is coupled via the conductors 11 with the direct-current voltage source or the alternating-current voltage source, so that there is generated a static or alternating magnetic field $\phi$. Additionally, there is provided an iron core 10a within the electromagnetic coil 10, which core as is known should serve for supporting the magnetic field. It will be recalled that when discussing the other embodiments of the figures of the drawings, reference was made to the feature of the exchangeability between the electromagnetic coil 10 and the permanent magnet 12. This exchangeability is also provided for with the arrangement of FIG. 7. When there is used a permanent magnet 12 in the arrangement of FIG. 7, of course it is possible to direct the north pole of such permanent magnet towards the work gap 14. It is also possible that the south pole be directed towards the work gap 14.

Figure 8:
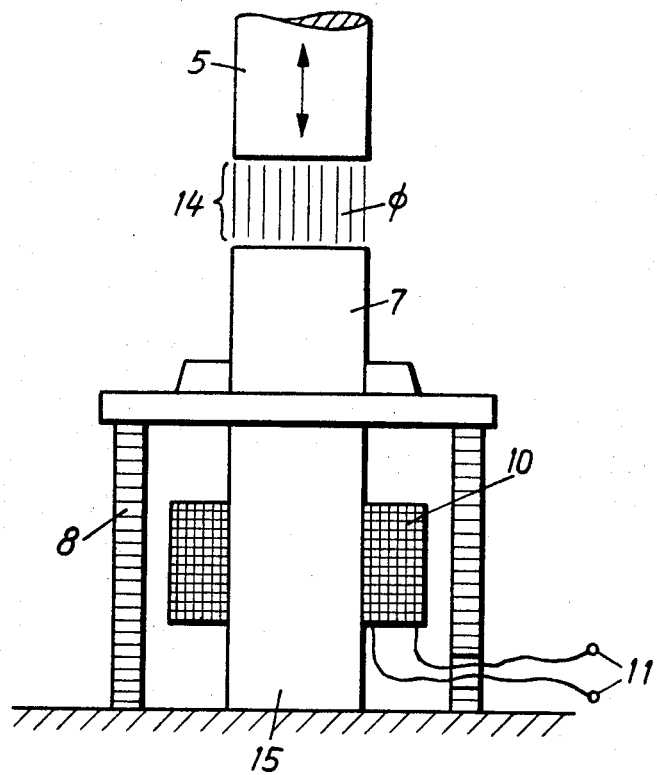
FIG. 8 illustrates the arrangement of the electromagnetic coil or the permanent magnet at the workpiece electrode.

FIG. 8 illustrates a still further embodiment for controlling the frontal work gap 14. Here the tool electrode 5 which is displaceable in the direction of the double-headed arrow, and the workpiece electrode 7 are formed of ferromagnetic materials. The electromagnetic coil 10 or the permanent magnet 12 are arranged at the workpiece electrode 7 about a ferromagnetic member 15. This ferromagnetic member or element 15 is necessary, since the support 8 consist of paramagnetic or diamagnetic material. Again, as already discussed above, by means of the conductors or lines 11 it is possible to supply the electromagnetic coil 10 with current. It should be unnecessary to mention that, just as was the case with the prior discussed embodiments, the permanent magnet 12 can be arranged either with its north pole or with its south pole facing the work gap 14.

Figure 9:
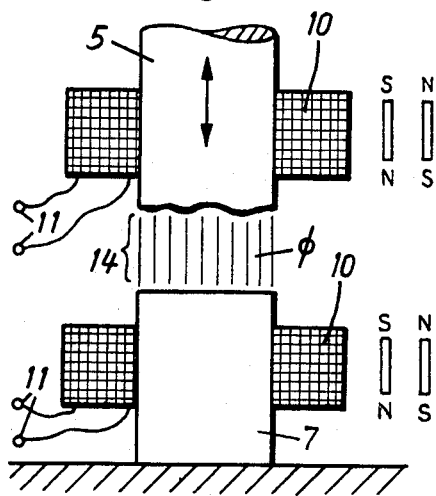
FIG. 9 illustrates the arrangement of two electromagnetic coils or two permanent magnets disposed about both of the electrodes.

FIG. 9 likewise illustrates an exemplary embodiment of the invention by means of which it is possible to control the frontal work gap 14 by changing the magnetic field. Both the tool electrode 5 and also the workpiece electrode 7 are each provided with an electromagnetic coil 10 or a permanent magnet 12. The electromagnetic coil 10 possesses the supply lines or conductors 11 leading to the direct-current voltage source or the alternating-current voltage source. The poles of the permanent magnet 12 can be optionally arranged in such a manner as indicated schematically by the symbols or letters N and S to the right of FIG. 9.

Figure 10:
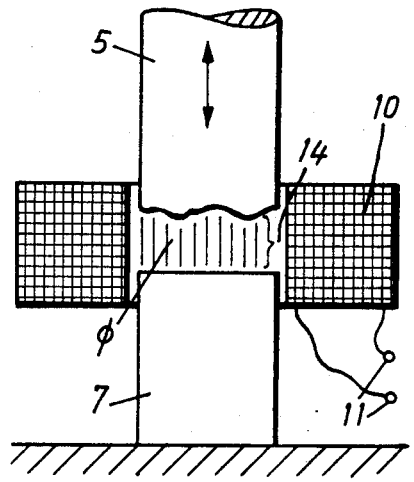
FIG. 10 illustrates a modified arrangement of an electromagnetic coil or a permanent magnet disposed about both of the electrodes.

The arrangement of electromagnetic coil 10 or permanent magnet 12 according to FIG. 10 is then selected if, for instance, the materials from which the tool electrode 5 and the workpiece electrode 7 are formed are paramagnetic or diamagnetic. The magnetic field $\phi$ is particularly advantageously influenced along the height of the work gap by virtue of this arrangement of the electromagnetic coil or the permanent magnet disposed about both electrodes 5,7 as shown. The pole of the permanent magnet 12 can also in this case be optionally arranged with respect to the electrodes as previously discussed heretofore. With the arrangement of FIG. 10 the width of the frontal gap 14 is controlled in a predetermined manner by varying the intensity of the magnetic field $\phi$. The control of the frontal work gap is in the order of magnitude of several millimeters up to several thousandths millimeters.

Figure 11:
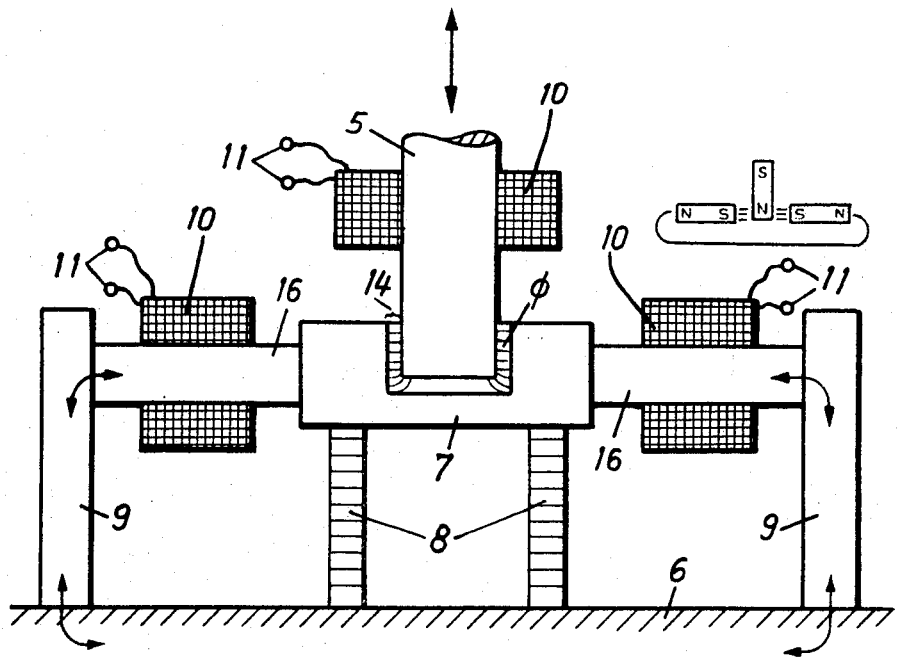
FIG. 11 schematically illustrates the arrangement of electromagnetic coils or permanent magnets at both electrodes for generating a magnetic field at the lateral regions of the work gap.

FIG. 11 illustrates an arrangement of a plurality of electromagnetic coils 10 or permanent magnets 12 for generating a magnetic field $\phi$ which now is present at the lateral work gap 14. An electromagnetic coil 10 is arranged about the tool electrode 5. At the sides of the workpiece electrode 7 there are provided the ferromagnetic components 16 which are connected by means of the support device 9 with the bottom of the vessel 6. The supports 8, upon which there is secured the workpiece electrode 7, consists of diamagnetic material. Due to this arrangement, that the magnetic flux $\phi$ only passes through the lateral work gap 14. In accordance with the adjusted intensity of the magnetic field $\phi$, this magnetic field controls the effective surfaces of both electrodes 5,7 which are only situated opposite one another at the lateral work gap. The conductors 11 of the individual electromagnetic coils 10, as already stated heretofore, are advantageously coupled with the direct-current voltage source or the alternating-current voltage source. Instead of using electromagnetic coils, it would also be possible to provide permanent magnets 12. The arrangement of the poles of the permanent magnets is represented by the symbols appearing to the right of FIG. 11. This arrangement ensures for an advantageous backing-up or support of the magnetic field $\phi$ at the lateral work gap 14. The north and south poles N,S can also be arranged in a different configuration. What is important is that the magnetic field $\phi$ is situated at the lateral work gap 14. The total magnetic circuit, which as will be recalled from the discussion of FIG. 1, consists of the table 1, the stand or upright 2, the feed device 3 and the electrode support 4, has not been particularly illustrated in this figure.

Figure 12:
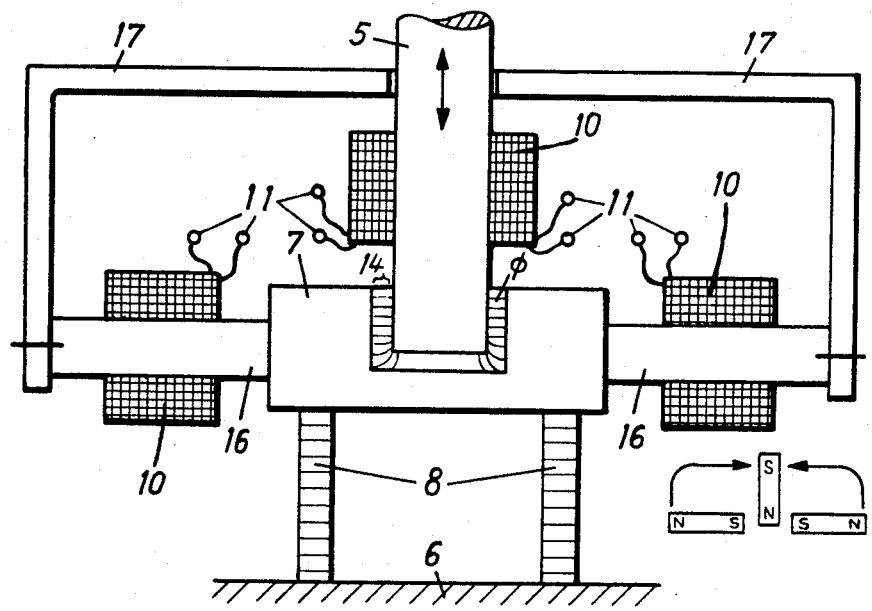
FIG. 12 schematically depicts a modified version of the arrangement of FIG. 11.

FIG. 12 illustrates an arrangement which is similar to that of FIG. 11. The primary difference in this case resides in the fact that the magnetic circuit is not closed via the erosion machinery, rather this magnetic circuit is directly fed back via a ferromagnetic sheet metal material 17 from the tool electrode 5 to the workpiece electrode 7. The generation of the magnetic field $\phi$ at the lateral work gap 14 is produced by the same arrangement of the electromagnetic coils 10 or permanent magnets 12, as previously discussed in the preceding figure. Also, in this case, the north and south poles N,S for advantageously supporting the magnetic field $\phi$ at the lateral work gap 14 have been symbolically represented to the right of FIG. 12. These poles N,S can also be arranged in a different configuration. The supports 8, upon which bears the workpiece electrode 7 are likewise formed of diamagnetic material. The bottom or floor of the vessel 6 is not used in the arrangement of FIG. 12 for the magnetic return of the field. The arrangement is then employed if the magnetic circuit through the erosion machinery is not particularly favorable. A further advantage of this arrangement of the invention resides in the fact that the sheet metal member 17 not only serves for guiding the magnetic field along the shortest path, rather also advantageously serves to screen against electrical fields.

Figure 13:
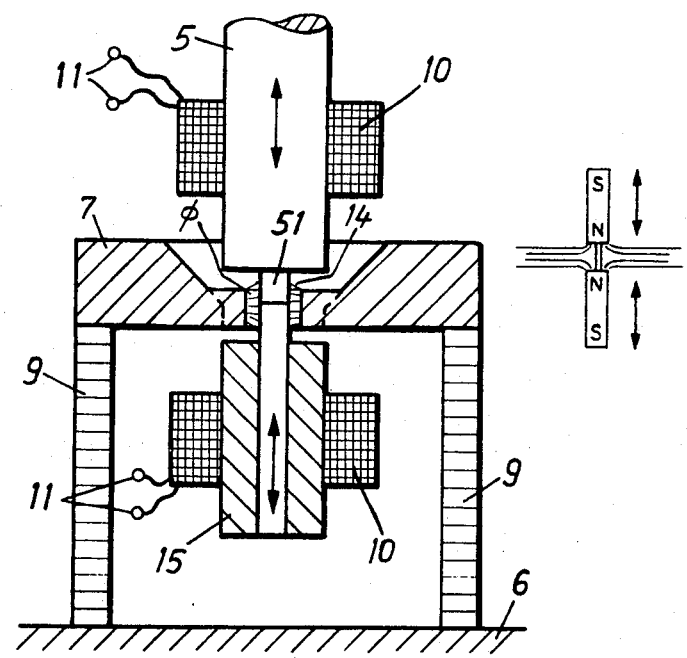
FIG. 13 schematically illustrates the arrangement of an electromagnetic coil or permanent magnet arranged about the tool electrode and at the workpiece electrode for generating a magnetic field at the lateral regions of the work gap.

With the embodiment of the invention as shown in FIG. 13, it is possible to likewise control the width of the lateral work gap 14 by varying the intensity of the magnetic field $\phi$. The electromagnetic coil 10 or the permanent magnet 12 is arranged about the tool electrode 5 which can be displaced in the direction of the double-headed arrow. If the electrode 5 is formed as a paramagnetic or diamagnetic material, then the electromagnetic coil or the permanent magnet 12 must be provided at the region of the work gap 14. In the case of ferromagnetic electrodes 5, the spacing between the work gap and the electromagnetic coils or the permanent magnets can be considerably greater. The workpiece electrode 7 is magnetically coupled via the support device 9 with the floor of the vessel 6. Beneath the tool electrode 7 there is located the ferromagnetic element or member 15 about which there is arranged a further electromagnetic coil or a further permanent magnet 12. The ferromagnetic element 15 possesses such a shape or configuration that it can be introduced into the central bore of the workpiece electrode 7. This central bore has been formed prior to the actual erosion operation depicted in FIG. 13. At the lower end of the tool electrode 5, the distance or spacer holder 51 which can be formed of a diamagnetic or paramagnetic material, such as for instance plastic. The ferromagnetic element 15, which prior to the erosion machining operation has been inserted into the central bore, bears against the spacer holder 51 secured to the bottom or lower end of the tool electrode 5. As the erosion operation proceeds, the ferromagnetic element 15 is likewise downwardly displaced by means of the tool electrode 5 which is advanced in the direction of the downwardly directed arrow. The poles N,S of the electromagnetic coil 10 or permanent magnet 12 arranged at the tool electrode 5 and the ferromagnetic element 15 are advantageously disposed at the lateral work gap 14 for supporting the magnetic field $\phi$ in such a manner as has been schematically indicated to the right of FIG. 13. However, as already mentioned in conjunction with the prior embodiments, here also different pole configurations are readily possible.

Now, with the arrangements of FIGS. 11, 12 and 13, it is possible by varying the intensity of the magnetic field $\phi$ to control the width of the lateral work gap in the order of magnitude of several millimeters up to several thousandths millimeters. If the intensity of the magnetic field is adjusted prior to beginning of the machining operation, then there is present a certain width of the lateral work gap throughout the entire machining operation. As already mentioned a number of times heretofore, this width can be adjusted independently of the electrical parameters of the generator, so that for the coarse machining operation and for the fine machining operation or finishing, there can be used the same tool electrode 5. If the intensity of the magnetic field is changed during the actual machining operation, then, there likewise occurs a change of the size of the work gap. Due to this change of the work gap, during the machining operation, there appears a recess at the workpiece electrode 7 which can possess a different form than the tool electrode 5. This is particularly important during the fabrication of so-called punch tools. In FIG. 13 such a recess has partially been shown by broken lines and partially by full lines. The control of the width of the lateral work gap 14 is only possible in the order of magnitude of several millimeters up to several thousandths millimeters. In this manner, it is possible to fabricate different forms of recesses at the workpiece electrode 7. It is also possible to produce a stepped-shaped or conical recess. This is dependent upon the change of the intensity or strength of the magnetic field $\phi$. The change in intensity of the magnetic field $\phi$ at the lateral work gap 14 can either be undertaken by the electromagnetic coils which are connected via their conductors 11 to the direct-current voltage source or alternating-current voltage source, or by the permanent magnets 12 which can be available in different dimensions.

Figure 14:
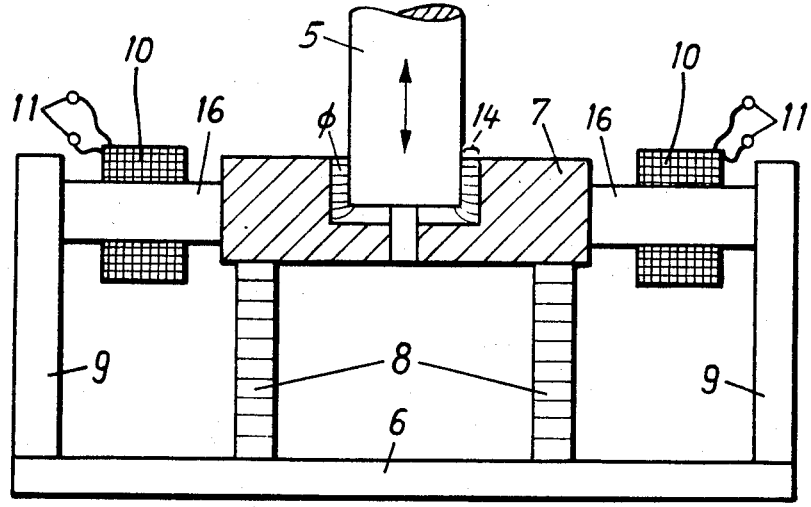
FIG. 14 illustrates the arrangement of an electromagnetic coil or a permanent magnet at the workpiece for generating a magnetic field at the lateral regions of the work gap.

FIG. 14 illustrates a similar arrangement to that shown in FIG. 11. However, in this instance, the only difference from the arrangement of FIG. 11 is that the tool electrode 5 does not possess any electromagnetic coil 10 or any permanent magnet 12. The control of the lateral work gap 14 is undertaken by varying the intensity of the magnetic field $\phi$ similar to that explained in conjunction with the embodiment of FIG. 11.

FIG. 15 is a top plan view of an arrangement of eight electromagnetic coils 10 or permanent magnets 12 about the workpiece electrode 7. These electromagnetic coils or permanent magnets are arranged at the height of the lateral work gap as shown in the arrangement of FIG. 14. In order to increase the magnetic field $\phi$, the electromagnetic coils 10 or permanent magnets 12 are mounted about ferromagnetic elements or components 16. FIG. 15 is intended to indicate that by providing an effective arrangement of the corresponding components it is possible to regulate the favorable affect of the magnetic field at the work gap for each machining operation.

The arrangement of FIG. 16 is intended to illustrate that for the purpose of introducing the magnetic field into the work gap 14 practically without losses, there is advantageously arranged a ferromagnetic material in the region of such work gap in the event a portion of the tool electrode is formed of diamagnetic or paramagnetic material. According to the arrangement of FIG. 16, the tool electrode 5 should be equipped at its end which is effective during the electro-erosion machining operation with a paramagnetic material 17, copper for instance. The remaining portion of the tool electrode 5 consists of ferromagnetic material. Arranged about this ferromagnetic material is either an electromagnetic coil 10 together with its infeed lines leading to the voltage source or a permanent magnet 12. As previously indicated in conjunction with FIG. 1, the magnetic circuit is closed by means of the electro-erosion machine. Even if in FIG. 16 there has only been indicated a frontal work gap, still the same arrangement can be undertaken for a lateral work gap. The disposition of the poles of the permanent magnet 12 in this case is of no greater moment than with the previously discussed embodiments and can, therefore, be undertaken in like manner as explained heretofore.

FIG. 17 illustrates a tool electrode 5 wherein the lower end which is effective for the electro-erosion machining operation contains a layer 17 consisting of paramagnetic or diamagnetic material and a filling 18 formed of ferromagnetic material. The layer 17, for instance, is formed of copper and fabricated galvanically or in accordance with so-called explosion or detonation techniques. The copper layer 17 for the arrangement of FIG. 17 is constructed in the shape of an automobile body. Therefore, the illustration is intended to indicate that the depicted tool electrode 5 can be used for the fabrication of press punches and dies for the automobile industry. The press tools are eroded from a non-illustrated workpiece electrode which is separated from the layer 17 by means of the work gap. As is well known in the automobile industry complete automobile bodies are fabricated during one press operation. The tool electrode 5 is therefore, in actuality, of the same size as the automobile body. Hence, particularly when using such large size tool electrodes the employment of a magnetic field $\phi$ at the work gap provides great advantage during the fabrication of press or stamping tools.

Figure 18:
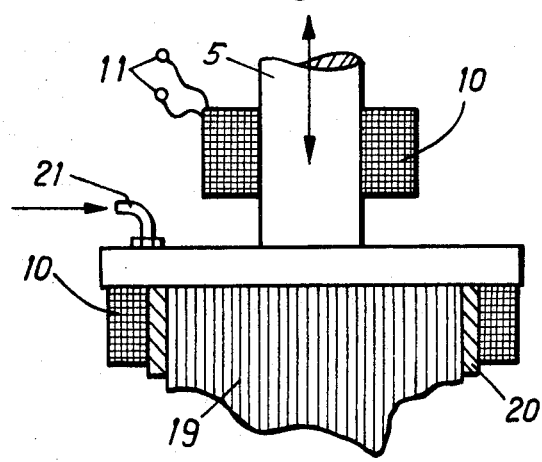

FIG. 18 illustrates a tool electrode 5 about which there is arranged an electromagnetic coil 10 or a permanent magnet 12. The tool electrode 5 consists of a multiplicity of rods or tubes 19. These rods or tubes 19 are of cylindrical configuration and extend in substantial parallelism with respect to one another. By means of the frame member 20, these rods or tubes 19 are pressed against one another and thus form the tool electrode. Since these rods or tubes 19 are of substantially cylindrical configuration intermediate spaces are formed between such members, and through which the medium, introduced under pressure via conduit 21 into the upper region of the frame unit 20, can arrive at the work gap. The upper portion of the frame member or frame unit 20 is constructed in such a fashion that it can receive the electromagnetic coil 10 with the infeed supply conductors 11 or the permanent magnet 12. Since the rods or tubes 19 consists of paramagnetic or diamagnetic material, there is additionally provided ferromagnetic material. Of course, this is not the case if the tubes or rods 19 themselves are formed of ferromagnetic material.

Figure 19:
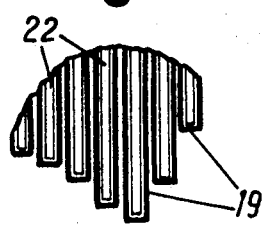

FIG. 19 schematically illustrates the manner in which ferromagnetic material 22 is introduced or filled into the tubes or rods 19. As a matter of convenience and illustration only seven tubes 19 have been shown in FIG. 19. Yet, it should be quite clear and understood that all of the tubes 19 of the arrangement of FIG. 18 can be filled in the same manner with the ferromagnetic material 22.

Figure 20:
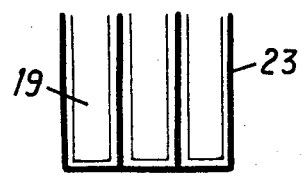

FIG. 20 schematically illustrates the manner in which the rods or tubes 19 of the arrangement of FIG. 18 are coated with ferromagnetic material 23. The ferromagnetic material 23 therefore, in this arrangement, is located at the outside surface of the relevant rod or tube members 19. Due to the addition of ferromagnetic material in the tubes or rods 19 consisting of paramagnetic or diamagnetic material, the magnetic conditions of the electrode of the arrangement of FIG. 18 are considerably improved.

Figure 21:
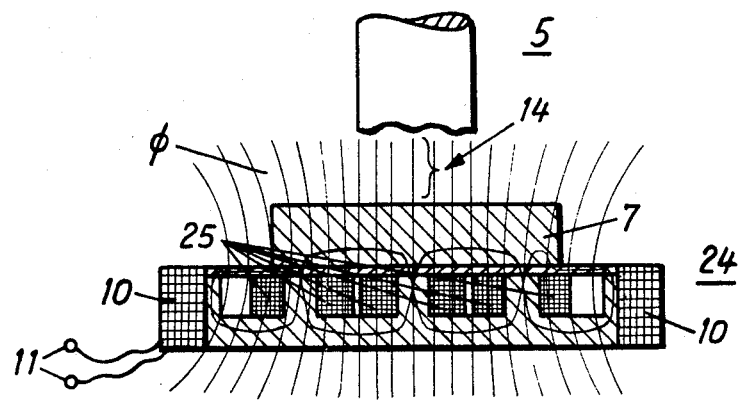
FIG. 21 illustrates the arrangement of an electromagnetic coil in a magnetic chuck.

FIG. 21 illustrates a magnetic chuck 24 at which there is electromagnetically attached the workpiece electrode 7 which is to be machined. As is generally known, this is undertaken by means of the magnetic coils 25. In so doing, it is important, however, that the electromagnetic coil 10 be arranged about the clamping member or chuck 24. When the current supplied by the infeed lines or conductors 11, coupled with the voltage source, flows through the electromagnetic coil 10 then there results the magnetic field $\phi$ at the work gap 14 between both electrodes 5 and 7. The unexpected effect of the magnetic field $\phi$ has already been described in conjunction with the other figures, so that it need not be considered or mentioned in detail at this point. With the arrangement of FIG. 21 there exists a further advantage with regard to the magnetic field $\phi$. This magnetic field eliminates the effect of the stray magnetic fields which are generated by the magnetic coils 25 of the chuck 24. Previously, the existence of these stray magnetic fields caused the disturbances at the work gap 14. It was for this reason that a magnetic chuck 24 could only be used in very few instances with the greatest difficulties for electro-erosion machining operations. By virtue of the existence of the magnetic field $\phi$ which is generated by the electromagnetic coil 10, there exists at the work gap 14 an essentially homogeneous magnetic field.

Finally, it is here mentioned that for supporting the magnetic circuit the magnetic resistance of the work gap 14 can be reduced in that the gaseous or liquid medium which flows or is flushed through the work gap during the machining operation is enriched with ferromagnetic particles. Such has not been particularly illustrated in the drawings.

By means of the permanent magnets 12, there is generated at the frontal or lateral work gap 14 a homogeneous magnetic field $\phi$. The intensity of the homogeneous, static magnetic field $\phi$ can be varied in that there can be provided different size or dimensioned permanent magnets. By means of the electromagnetic coil 10 there is generated at the work gap a static, homogenous or uniform magnetic field $\phi$ when the infeed lines 11 are coupled with a direct-current voltage source. The intensity of the magnetic field $\phi$ can be regulated at the control device 26 of the arrangement of FIG. 1. If the infeed lines of the electromagnetic coil 10 are coupled with an alternating-current voltage source, then, there results a magnetic alternating field $\phi$ at the work gap 14. With the aid of the control device 26, it is possible to adjust the intensity and frequency of the magnetic field $\phi$. However, the frequency of the magnetic field $\phi$ must be in the order of magnitude of the frequency of the sparks or work pulses at the work gap 14. Since the electrical parameters of the generator as well as the intensity and frequency of the magnetic field can be adjusted at the control device of the arrangement of FIG. 1, this requirement can be effortlessly and easily fulfilled. During the adjustment of the alternating magnetic field $\phi$ care must be taken to ensure that a certain phase displacement is maintained between the magnetic field and the sparks at the work gap 14. As is known, a magnetic field which builds-up suppresses the formation of sparks at the work gap 14. On the other hand, a decreasing magnetic field supports the formation of sparks at the work gap 14. By continuously controlling the phase of the alternating magnetic field in relation to the sparks there can be obtained a desired adjustment for each electro-erosion machining operation.

Also to be mentioned is the provision of a static or alternating magnetic field $\phi$ at the work gap 14 which can be used for suppressing arcs. It is well-known in this particular art that during the working operation there occur at the work gap short-circuit like conditions or arcs which are undesired. By appropriately controlling the magnetic field $\phi$ at the moment of the occurrence of a short-circuit like condition or an arc at the work gap, such undesired phenomena can be suppressed.

While there is shown and described present preferred embodiments of the invention, it is to be distinctly understood that the invention is not limited thereto but may be otherwise variously embodied and practiced within the scope of the following claims.

WHAT IS CLAIMED IS:

1. A method for electro-erosion machining and for improving the flushing conditions occuring at the work gap, which work gap is formed of at least one tool electrode and at least one workpiece electrode and contains a liquid and/or gaseous medium, with at least one generator serving to deliver an operating voltage to the work gap, the improvement comprising the steps of superimposing a magnetic field at the work gap upon the operating voltage, the lines of force of said magnetic field being situated essentially perpendicular to the erosion front and increasing the intensity of said magnetic field in order to increase the width of said work gap for a given set of discharge parameters.

2. The method as defined in claim 1, further comprising the steps of generating the magnetic field in the work gap such that its lines of force are disposed essentially parallel to the feed direction of the tool electrode and workpiece electrode, and controlling the width of the frontal work gap by means of the intensity of the magnetic field.

3. The method as defined in claim 1, further including the step of generating the magnetic field at the work gap in such a manner that its lines of force are essentially perpendicular to the feed direction of the tool electrode and workpiece electrode, and controlling the width of the lateral work gap by means of the intensity of the magnetic field.

4. The method as defined in claim 1, further including the step of generating the magnetic field at the work gap in such a manner that its lines of force essentially enclose an angle of maximum 90° with the feed direction of the tool electrode and the workpiece electrode.

5. The method as defined in claim 1, including the step of adjusting the intensity of the magnetic field at the work gap in such a manner that the same tool electrode can be used for coarse machining operations, pre-finishing machining operations and finishing operations.

6. The method as defined in claim 1, further including the step of altering the intensity of the magnetic field during the machining operation so that a cylindrical tool electrode produces a recess of a different shape in the workpiece electrode.

7. An electro-erosion machining apparatus comprising at least one tool electrode and at least one workpiece electrode forming therebetween a work gap embodying a frontal work gap and a lateral work gap, means for displacing said tool electrode and workpiece electrode relative to one another, means for delivering an operating voltage to the work gap, and means defining at least one magnetic circuit closed by the work gap and incorporating magnet means for superimposing a magnetic field at the work gap upon the operating voltage, the lines of force of said magnetic field being disposed essentially perpendicular to the erosion front and the intensity of the said magnetic field controlling the width of the work gap whereby for a given set of discharge parameters the work gap would be made wider and flushing of the work gap substantially improved.

8. The apparatus as defined in claim 7, wherein said magnet means comprises at least one electromagnetic coil.

9. The apparatus as defined in claim 7, wherein said magnet means comprises at least one permanent magnet.

10. The apparatus as defined in claim 7, wherein said magnet means is arranged about one of said electrodes so that the magnetic field of the frontal work gap is essentially parallel to the feed direction of the tool electrode and the workpiece electrode.

11. The apparatus as defined in claim 7, wherein said magnet means is arranged at least in one of said electrodes such that the magnetic field of the frontal work gap is essentially parallel to the feed direction of the tool electrode and workpiece electrode.

12. The apparatus as defined in claim 7, wherein said magnet means is arranged about one of said electrodes such that the magnetic field at the lateral work gap is essentially perpendicular to the feed direction of the tool electrode and the workpiece electrode.

13. The apparatus as defined in claim 7, wherein said magnet means is arranged at least in one of said electrodes in such a manner that the magnetic field of the lateral work gap is essentially perpendicular to the feed direction of the tool electrode and the workpiece electrode.

14. The apparatus as defined in claim 7, further including ferromagnetic material arranged at the region of the work gap for the practically loss-free introduction of the magnetic field at the work gap.

15. The apparatus as defined in claim 10, wherein the tool electrode embodies a layer formed of magnetic material and contains a ferromagnetic filling.

16. The apparatus as defined in claim 15, wherein the magnetic material is a substance selected from paramagnetic and diamagnetic materials.

17. The apparatus as defined in claim 14, wherein said tool electrode consists of a plurality of substantially cylindrical shaped tubes arranged in substantial parallelism to one another and formed of a magnetic material, each tube being filled with a ferromagnetic material.

18. The apparatus as defined in claim 17, wherein said magnetic material is a substance selected from paramagnetic and diamagnetic materials.

19. The apparatus as defined in claim 14, wherein said tool electrode consists of a plurality of substantially cylindrical shaped rod members arranged in substantial parallelism to one another and formed of ferromagnetic material, each rod member being coated with a magnetic material.

20. The apparatus as defined in claim 19, wherein the coating material is a substance selected from the group consisting of paramagnetic and diamagnetic materials.

21. The apparatus as defined in claim 17, further including a holding mechanism in the form of frame means surrounding said tubes at the ends thereof facing away from the workpiece electrode, said frame means being formed of ferromagnetic material and serving as the support for the magnet means.

22. The apparatus as defined in claim 19, further including a holding mechanism in the form of frame means surrounding said rod members at the ends thereof facing away from the workpiece electrode, said frame means being formed of ferromagnetic material and serving as the support for the magnet means.

23. The apparatus as defined in claim 7, further including magnetic chuck means for attaching one of said electrodes, said magnet means comprising an electromagnetic coil arranged at said magnetic chuck, said electromagnetic coil eliminating stray magnetic fields and generating a uniform magnetic field at the work gap.

24. The apparatus as defined in claim 7, wherein a fluid medium is provided for the work gap which is enriched with ferromagnetic particles.

25. The apparatus as defined in claim 7, wherein said magnet means comprises an electromagnetic coil, supply lines connectible with a direct-current voltage source and electrically coupled with said electromagnetic coil for generating a uniform static magnetic field.

26. The apparatus as defined in claim 7, wherein said magnet means comprises an electromagnetic coil, and supply lines for said electromagnetic coil coupled with an alternating-current voltage source for generating an alternating magnetic field, the frequency of which is in the order of magnitude of the frequency of the work pulses arriving at the work gap.

* * * * *